Jan. 2, 1962 W. P. KIMSEY ET AL 3,015,173
SHIPPING ACCESSORY FOR TRACTOR DRAWN SCRAPERS
Filed Aug. 29, 1960 2 Sheets-Sheet 1

INVENTORS
WOODROW P. KIMSEY
BY WILLIAM J. RYAN

Fryer and Tjensvold
ATTORNEYS

*INVENTOR.*
WOODROW P. KIMSEY
BY WILLIAM J. RYAN

ATTORNEYS

United States Patent Office 3,015,173
Patented Jan. 2, 1962

3,015,173
SHIPPING ACCESSORY FOR TRACTOR
DRAWN SCRAPERS
Woodrow P. Kimsey, Lockport, and William J. Ryan, Joliet, Ill., assignors to Caterpillar Tractor Co., Peoria, Ill., a corporation of California
Filed Aug. 29, 1960, Ser. No. 52,408
3 Claims. (Cl. 37—129)

This invention relates to transportation of large earthmoving equipment and particularly to relieving difficulties which arise because of the necessity of partially disassembling certain large units to meet maximum shipping space requirements.

Large tractor-scraper combinations of certain types are greater in width than maximum shipping limits allowed, for example, on railroad flat cars. It has been customary to remove the draft arms from the sides of the scraper bowl of such units in order to reduce their width for shipping. Since a crane or other lifting equipment is seldom available at the point of loading, the handling of the draft arms is a cumbersome and costly procedure. It is desirable to remove the draft arms in a shop where a crane is available to deposit them in the bowl of the scraper. This, however, precludes driving or towing the tractor-scraper combination to the point of loading and onto the carrier. The draft arms provide pivotal connections about which the scraper bowl is raised and lowered and if the bowl cannot be lowered after loading, the entire unit rests on rubber tires causing excessive bounce and necessitating the use of complex and costly anchoring means to insure safe transportation. This bouncing can be eliminated by lowering the bowl into contact with the deck of the carrier.

The object of the present invention is to provide accessory means readily attachable to a tractor-scraper combination to provide temporary draft means when the draft arms are removed and to enable the bowl thereof to be manipulated through the usual operator controls in the absence of the draft arms ordinarily necessary for this function.

The manner in which the foregoing object is accomplished as well as further and more specific objects and advantages of the invention are best understood from the following description wherein reference is made to the accompanying drawings illustrating a preferred form of the invention.

Figure 1:
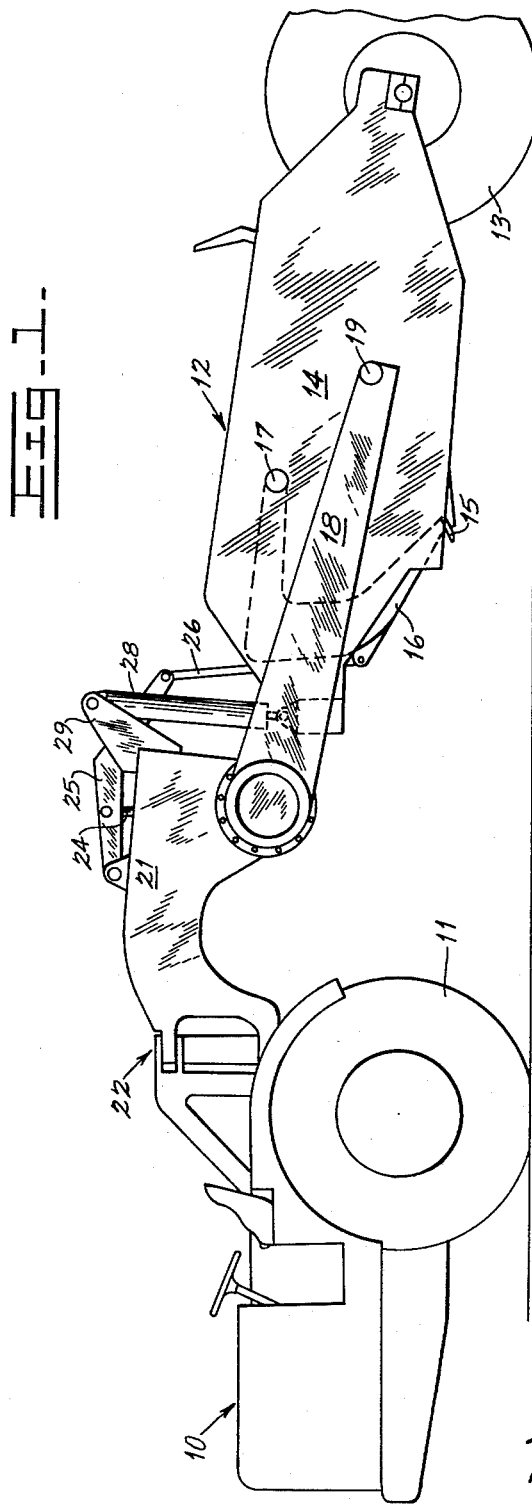
FIG. 1 is a view in side elevation of a tractor-scraper combination disclosing the principal parts thereof necessary to an understanding of the present invention.
Figure 2:
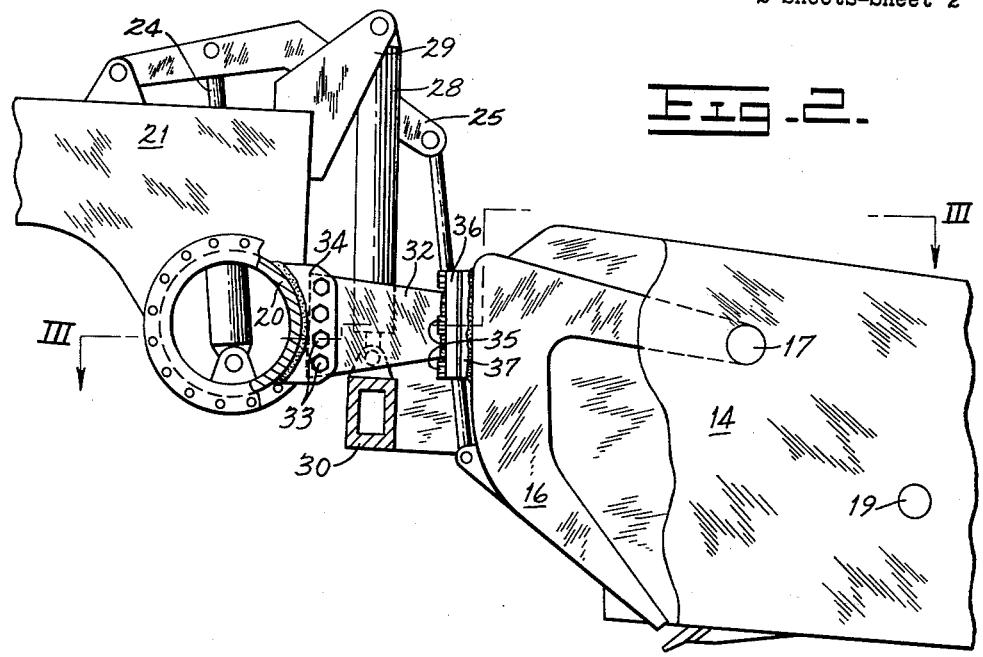
FIG. 2 is an enlarged fragmentary view partially in section showing the forward portion of the scraper and illustrating the present invention in place thereon.

In FIG. 1, a two-wheel tractor generally indicated at 10 and having rubber tired wheels 11 is shown in the usual relationship with a scraper generally indicated at 12 having rubber tired wheels 13. The scraper comprises a bowl 14 having a forward cutting edge 15 adapted to be lowered into engagement with the ground to effect cutting and loading of earth into the scraper through its forward end. The forward end may be opened or closed by means of an apron 16 (see also FIG. 2) which is pivotally connected as at 17 to the sides of the bowl. Draft arms 18 are also pivotally connected as at 19 to the sides of the bowl and extend rearwardly from the opposite ends of a transversely extending spreader tube 20 best shown in FIGS. 2 and 3. This spreader tube is carried at the rear end of a gooseneck 21 with which it forms a draft assembly connected by a hitch assembly, generally indicated at 22, with the tractor. The apron 16 is raised and lowered by a hydraulic cylinder, not shown, the rod of which is illustrated at 24 as connected with a pivoted lever 25 which is in turn connected with the apron by means of a link 26. The bowl 14 is moved between its lower digging position and its upper position shown by one or more hydraulic cylinders 28 extending between brackets 29 on the gooseneck and the forward end of the bowl where they may be pivotally connected, as best shown in FIG. 2, with a beam 30 extending transversely of the forward end of the bowl. In some types of scrapers, the control of the apron and bowl is accomplished through cables wound upon power actuated winches and the present invention is also adaptable to such cable actuated scrapers as well as to tractor-scraper combinations where four wheel tractors are employed as will be apparent from an understanding of the invention as applied to the typical apparatus herein illustrated.

As is apparent from the present illustration, extension of the jacks 28 effects lowering of the bowl 14 about the axis of the wheels 13 which is made possible by the pivotal connection 19 of the draft arms with the sides of the bowl. The present invention provides a temporary rigid connection between the spreader tube 20 and the forward end of the apron 16 which serves as a draft connection between the spreader tube and the bowl to enable operation of the equipment under its own power from a shop to a point of loading and also enables raising and lowering of the bowl through the usual means which in the present illustration consists of the hydraulic cylinders 28.

Figure 3:
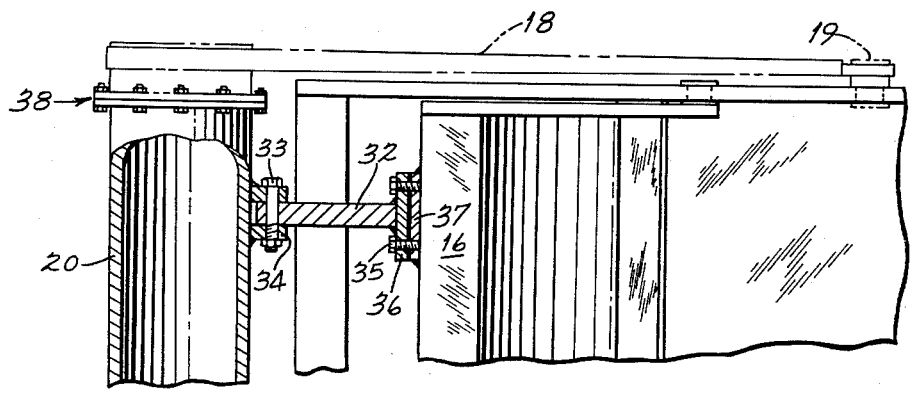
FIG. 3 is a fragmentary sectional view taken on the line III—III of FIG. 2.

As shown in FIGS. 2 and 3, this is accomplished by the provision of one or more, preferably two, draft links 32 adapted to be temporarily connected between the spreader tube and the apron 16 during transportation of the apparatus. The draft links 32, one of which is shown in the drawings, are connected as by bolts 33 between suitable spaced brackets 34 welded to the rear face of the spreader tube 20. At their rear ends, the draft links are connected as by cap screws 35 extending through plates 36, which are welded to the draft links, and threaded into tapped holes in reinforcing plates 37 welded to the forward face of the apron 16. The brackets 34 and reinforcing plates 37 of course always remain in place without interfering in any way with the normal functioning of the apparatus and the draft links 32 are secured in place only for the purpose of transportation. With the links 32 secured in place, the draft arms 18, shown in broken lines in FIG. 3, may be removed by disassembling their flanged and bolted connections generally indicated at 38 and this may be accomplished in a shop where means are available for manipulating the large and unwieldy draft arms and depositing them in the bowl for shipment. In this condition, the unit may be driven to a point of loading and driven onto a carrier under its own power. The operator then manipulates the controls, not shown, for extending the jacks 28 and the bowl 14 will swing downwardly about the axis of its wheels 13 by virtue of the pivotal connections 17 of the apron which remains substantially in the position illustrated because of its rigid connection with the spreader tube 20. Upon reaching its destination, the bowl can be similarly raised by retraction of the hydraulic cylinders 28 and the apparatus may again be driven under its own power to a shop or other location where equipment is available for manipulating the draft arms into position for reassembly.

With the present invention, it is unnecessary to ship the tractor-scraper combination resting only upon its rubber tires and the stability during transportation afforded by the engagement of the cutting edge of the scraper bowl with the carrier deck greatly reduces the cost of anchoring the apparatus for transportation.

We claim:

1. In a tractor-scraper combination wherein the scraper has a bowl supported by rearwardly disposed wheels, and draft arms pivoted to opposite sides of the bowl and extending forwardly to a draft assembly and hitch on the tractor whereby the bowl may be raised and lowered by pivotal movement about the axis of said wheels and upon pivotal movement of the draft arms relative to the bowl, and wherein an apron is pivoted to the bowl for swinging movement in a vertical plane to open and close the forward end of the bowl, the improvement which comprises means rigidly connecting the apron to the draft assembly whereby upon removal of the draft arms the bowl can be raised and lowered about the axis of the wheels and upon pivotal movement of the apron relative to the bowl.

2. In a tractor-scraper combination in which the scraper has a bowl and is supported forwardly by the tractor and rearwardly by wheels and includes draft arms pivoted to the sides of the bowl to permit raising and lowering of the forward edge of the bowl, and in which an apron is pivoted to the bowl to open and close its forward end, the improvement which comprises a temporary rigid draft connection between the forward part of the scraper and the apron to permit raising and lowering of the bowl with the draft arms removed.

3. In a tractor-scraper combination in which the scraper has a bowl and is supported forwardly by the tractor and rearwardly by wheels and includes draft arms pivoted to the sides of the bowl to permit raising and lowering of the forward edge of the bowl, power actuated means connecting the forward portion of the scraper with the forward edge of the bowl, and an apron pivoted to the bowl to open and close its forward end, the improvement which comprises a removable rigid draft connection between the forward part of the scraper and the apron to enable raising and lowering of the bowl with said power actuated means while said draft arms are removed.

References Cited in the file of this patent

UNITED STATES PATENTS

| | | |
|---|---|---|
| 2,495,336 | LeTourneau | Jan. 24, 1950 |
| 2,854,768 | Gurries | Oct. 7, 1958 |